United States Patent
Simpson

(10) Patent No.: US 7,210,697 B2
(45) Date of Patent: May 1, 2007

(54) CONVERTIBLE HANDLE

(75) Inventor: Dennis Simpson, Minnetonka, MN (US)

(73) Assignee: Tricam International, Inc., Eden Prairie, MN (US)

( * ) Notice: Subject to any disclaimer, the term of this patent is extended or adjusted under 35 U.S.C. 154(b) by 0 days.

(21) Appl. No.: 11/014,247

(22) Filed: Dec. 16, 2004

(65) Prior Publication Data

US 2006/0131835 A1 Jun. 22, 2006

(51) Int. Cl.
*B60F 5/00* (2006.01)
*B60D 1/07* (2006.01)
*B62B 3/00* (2006.01)

(52) U.S. Cl. ............... 280/415.1; 280/47.34; 280/47.36; 280/47.371; 280/416.1; 16/405; 16/406; 16/426; 16/444; 16/446

(58) Field of Classification Search .......... 280/47.34, 280/47.36, 47.371, 415.1, 416.1; 16/405, 16/406, 426, 444, 446
See application file for complete search history.

(56) References Cited

U.S. PATENT DOCUMENTS

| | | | |
|---|---|---|---|
| 2,210,292 A | 8/1940 | Hodgkin | |
| 2,399,043 A | 4/1946 | Klumb | |
| 2,760,790 A | 8/1956 | Andrews | |
| 2,794,657 A | 6/1957 | Anderson | |
| 3,091,967 A | 6/1963 | Hurdlow | |
| 3,100,120 A | 8/1963 | Cleary | |
| 3,130,443 A | 4/1964 | Tonelli | |
| 4,037,853 A | 7/1977 | Sparks | |
| 4,227,709 A | 10/1980 | Gradwohl et al. | |
| 4,277,075 A | 7/1981 | Shay | |
| 4,645,224 A | 2/1987 | Poganski | |
| 4,953,886 A | 9/1990 | Grant | |
| 5,180,179 A | 1/1993 | Salvucci | |
| 5,257,892 A | 11/1993 | Branch | |
| 5,319,829 A | 6/1994 | Manuel | |
| 5,337,609 A | 8/1994 | Hsu | |
| 5,529,323 A | 6/1996 | Vom Braucke et al. | |
| 5,669,617 A | 9/1997 | Pasin et al. | |
| 5,906,452 A | 5/1999 | Lee | |
| 5,941,585 A | 8/1999 | McAlister | |
| 6,182,988 B1 | 2/2001 | Wu | |
| 6,409,188 B1 | 6/2002 | Hesmer | |
| 6,868,581 B2 * | 3/2005 | Browder | 16/110.1 |
| 2002/0096857 A1 | 7/2002 | Valdez et al. | |

* cited by examiner

*Primary Examiner*—Lesley D. Morris
*Assistant Examiner*—Marc A. Scharich
(74) *Attorney, Agent, or Firm*—Patterson, Thuente, Skaar & Christensen, P.A.

(57) ABSTRACT

A convertible handle having a tongue portion and a handle portion. The handle portion has a clevis proximate a first end thereof and a gripping region proximate a second end thereof. The handle portion is pivotable with respect to the tongue portion for manually towing a towed vehicle that is attached to the tongue portion using the gripping region or attaching the clevis to a towing vehicle.

14 Claims, 4 Drawing Sheets

CONVERTIBLE HANDLE

FIELD OF THE INVENTION

The present invention generally pertains to a convertible handle. More specifically, the present invention pertains to a convertible handle that enables a towed vehicle to either be moved manually or by attachment to a towing vehicle.

BACKGROUND OF THE INVENTION

It is common to attach a towed vehicle such as a trailer to a towing vehicle by use of a rigid member with an articulating connection at the points of attachment to the vehicles. Many methods are used for making the attachment. For example, heavy trailers are often connected with the pintle arrangement discussed in U.S. Pat. No. 5,941,585. Lighter trailers for highway use are often connected with a ball and hitch apparatus as shown U.S. Pat. No. 4,645,224.

For still lighter towed vehicles, however, the connection is often simpler. Light utility trailers for off-highway use, such as a trailer for a garden tractor for example, are often connected with a simple pin connection. For instance, the pin connection can take the form of a rigid tongue member connected at one end to the towed vehicle and having a hitch consisting of a clevis at the other end. The clevis has a hole or aperture through each branch of the clevis. The towing vehicle is provided with a projecting tab at its rear side also having a hole or aperture through it. When the clevis end of the tongue is mated with the tab projecting from the towing vehicle, the holes can be aligned and a pin inserted to couple the two vehicles together.

Tight maneuvering, especially backing, of a towed vehicle while connected to the towing vehicle is often difficult. Also, it is sometimes desirable to move a towed vehicle in places where the towing vehicle cannot go. Accordingly, it is sometimes necessary to manually pull and maneuver a towed vehicle. The apparatus used for connecting the tongue of the towed vehicle to the towing vehicle, however, is normally not conducive to gripping with the human hand. For that reason, various apparatus have been designed over time to provide detachable handles for use with a tongue of a towed vehicle.

For pintle towed trailers, the handle described in U.S. Pat. No. 5,941,585 attaches to the pintle ring, allowing two persons to lift the tongue and maneuver the trailer. This device, however, is suitable only for pintle type connections.

For lighter trailers using a ball and hitch, the handle of U.S. Pat. No. 4,645,224 can be attached to the tongue member, allowing one or two persons to lift and maneuver the trailer. The spring-loaded, twist-locking arrangement of this apparatus, however, requires the tongue member to have a somewhat large cross-section to accommodate the apparatus. Towed vehicles light enough to use a pin-connection type hitch generally do not use a tongue having a large cross section. Accordingly, such a handle is usually not suitable for use with a lighter towed vehicle.

What is needed is an easily detachable handle that can be used with the tongue of a towed vehicle, where the towed vehicle has a tongue with a pin-connection type hitch.

SUMMARY OF THE INVENTION

An embodiment of the invention is direct to a convertible handle having a tongue portion and a handle portion. The tongue portion has a first end and a second end. The first end is suited for attachment to an object that is to be towed. The handle portion is pivotally attached to the tongue portion proximate the second end. The handle portion has a first end and a second end. Proximate the first end, the handle portion has a clevis formed therein. Proximate the second end, the handle portion has a gripping region that is oriented generally transverse to the handle portion.

Another embodiment of the invention is directed to a method of towing a vehicle.

DETAILED DESCRIPTION OF THE PREFERRED EMBODIMENTS

Figure 1:
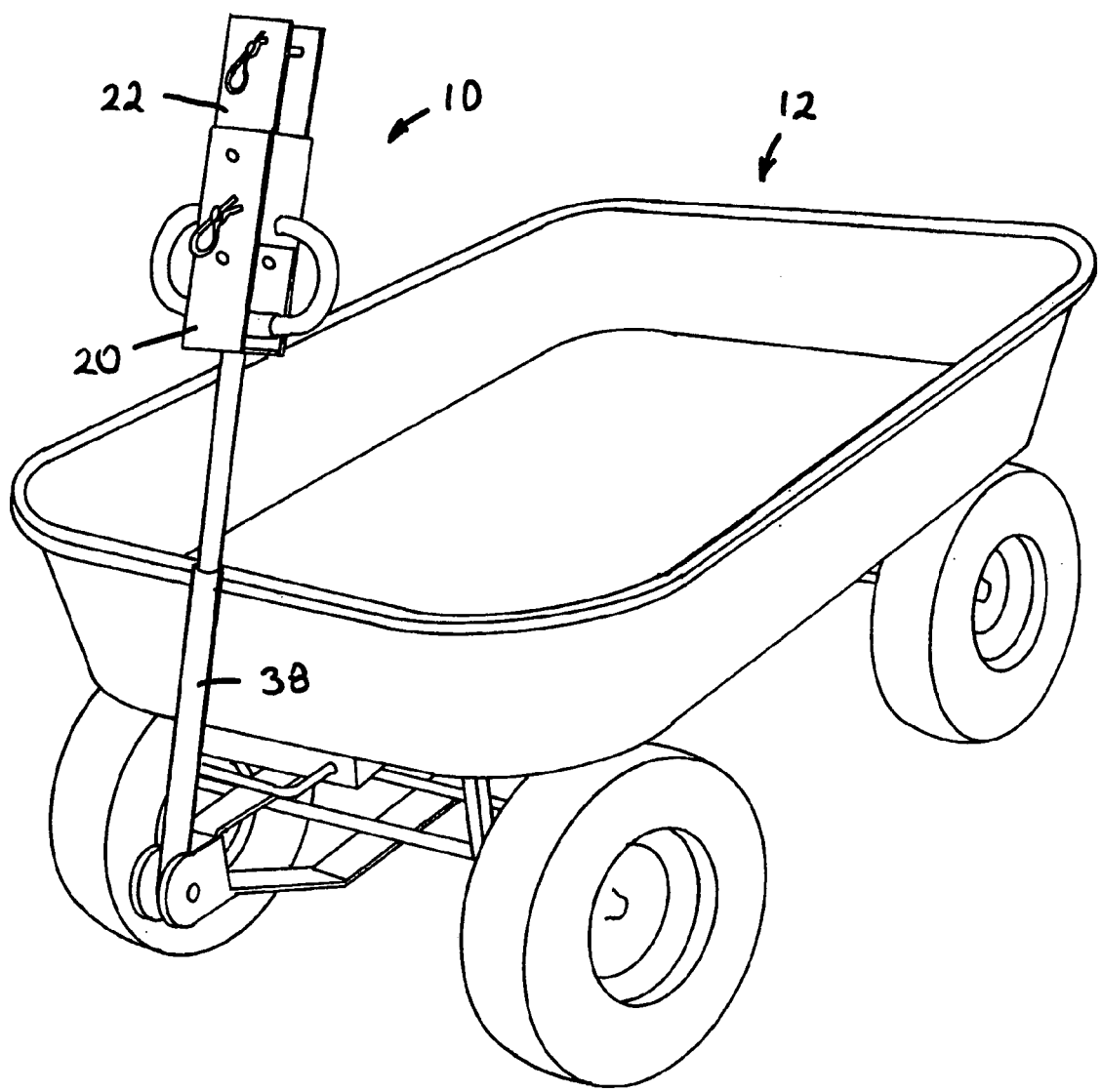
FIG. 1 is a perspective view of a convertible handle according to an embodiment of the invention attached to a cart.
Figure 2:
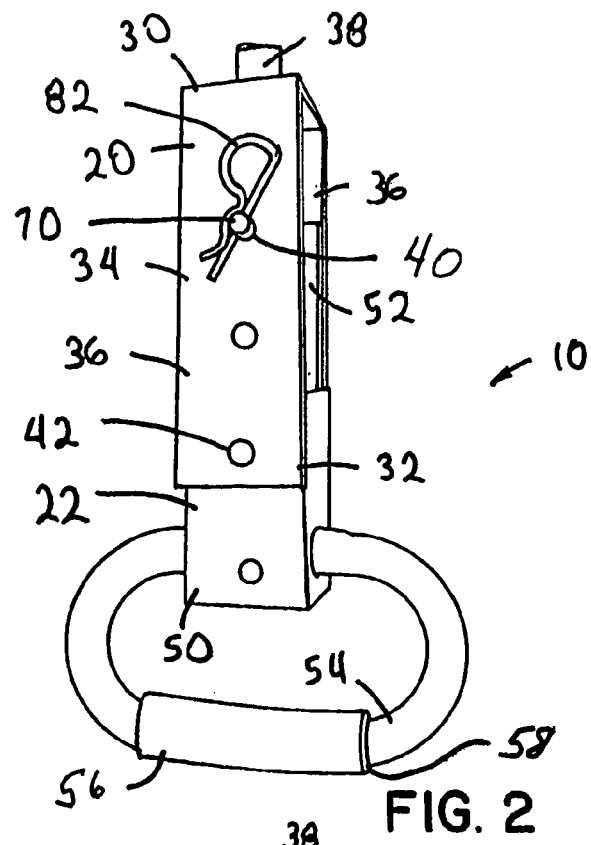
FIG. 2 is a top view of the convertible handle in a first configuration.
Figure 3:
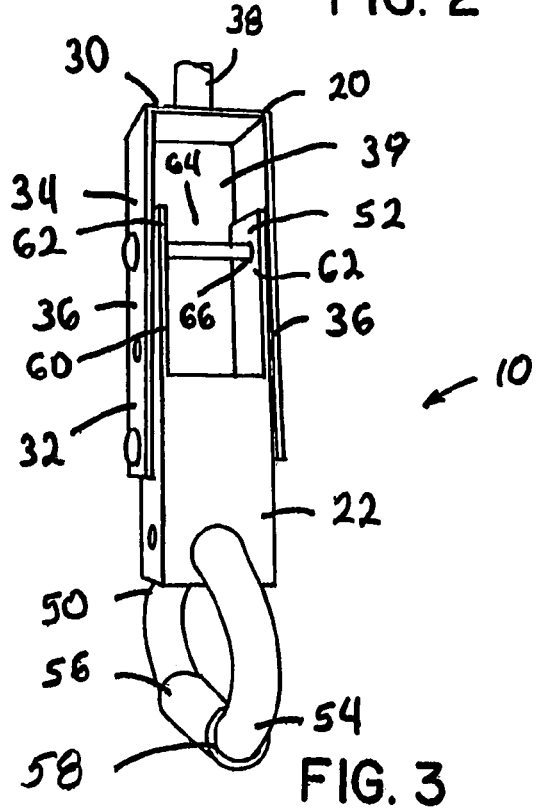
FIG. 3 is a side view of the convertible handle in the first configuration.
Figure 4:
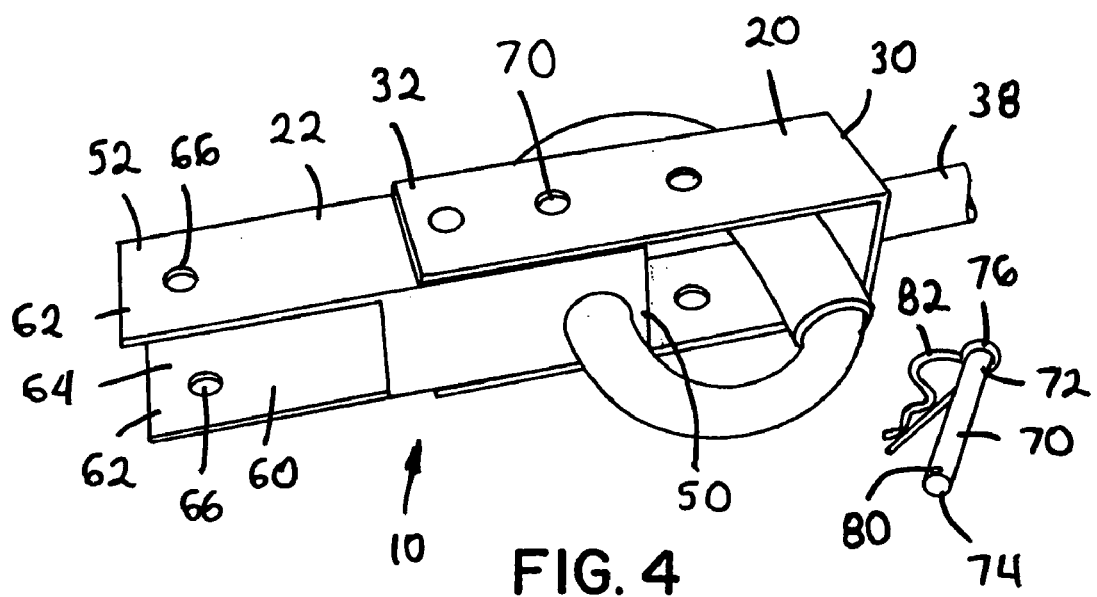
FIG. 4 is a perspective view of the convertible handle in a second configuration.
Figure 5:
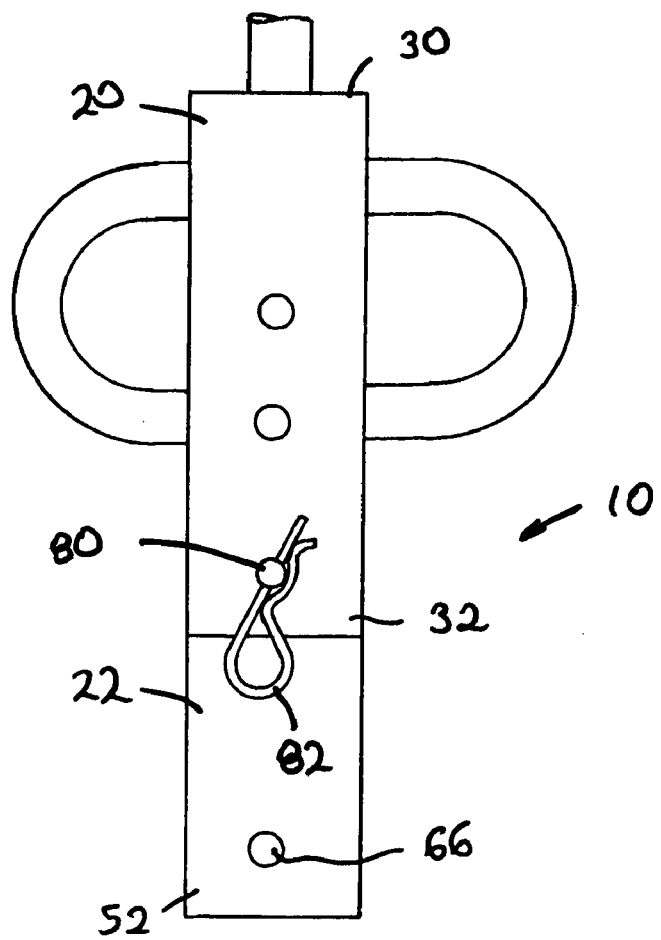
FIG. 5 is a top view of the convertible handle in the second configuration.

The invention is a convertible handle that is suitable for use with towing an object such as a trailer, as illustrated at 10 in FIG. 1. The convertible handle 10 is adaptable for use in either a first configuration (FIGS. 1–3) or a second configuration (FIGS. 4–5).

When in the first configuration, the convertible handle 10 is adapted for manually towing the trailer 12. When in the second configuration, the convertible handle 10 is adapted for attachment to a towing vehicle such as a tractor. The convertible handle 10 thereby permits changes between the two configurations without the need to store parts that are not needed in one of the configurations.

The convertible handle 10 generally includes a tongue portion 20 and a handle portion 22. The handle portion 22 is preferably pivotally attached to the tongue portion 20 such that pivoting of the handle portion 22 with respect to the tongue portion 20 moves the convertible handle 10 between the first configuration and the second configuration.

The tongue portion 20 has a first end 30 and a second end 32. The first end 30 has a shaft 38 extending therefrom and is adapted for removably attaching the tongue portion 20 to a trailer, utility cart, or other towed vehicle 12. The second end 32 preferably has a clevis 34 that is defined by a pair of branches 36. Between the branches 36 a recess 39 is defined. Alternatively, the second end 32 may include only a single branch 36.

The branches 36 each have a first clevis aperture 40 and a second clevis aperture 42 formed therein. The first clevis apertures 40 are preferably axially aligned and are used for pivotally mounting the handle portion 22 with respect to the tongue portion 20. The second clevis apertures 42 are preferably axially aligned and are used for retaining the handle portion 22 in a stationary position with respect to the tongue portion 20.

The handle portion 22 has a first end 50 and a second end 52. The first end 50 (as most clearly illustrated in FIGS. 2 and 3) has a gripping region 54 that permits a person to hold on to the handle portion 22. The gripping region 54 preferably has a loop configuration.

The gripping region 54 is preferably oriented substantially transverse to the shaft 38. A gripping area 56 on gripping region 54 is preferably substantially straight to facilitate holding handle portion 22 in a person's hand. To enhance the ability to hold handle portion 22, the gripping area 56 is preferably covered with a resilient foam material 58.

The second end 52 preferably has a clevis 60 that is defined by a pair of branches 62 (as most clearly illustrated in FIGS. 4 and 5). Between the branches 62 a recess 64 is defined. The branches 62 each have a clevis aperture 66 formed therein. The clevis apertures 66 are preferably co-axially aligned. Alternatively, the second end 52 may include only a single branch 62 depending on the towing object to which the convertible handle 10 is to be attached.

At an intermediate position on the handle portion 22, a pivot aperture (not shown) is formed therein. The handle portion 22 also preferably includes a locking aperture 68 formed therein between the pivot aperture and the first end 50.

The convertible handle 10 preferably includes a pair of attaching pins 70. A first attaching pin 70 pivotally attaches the handle portion 22 to the tongue portion 20. A second attaching pin 70 extends through the tongue portion 20 and the handle portion 22 to retain the handle portion 22 in a stationary position with respect to the tongue portion 20.

The attaching pin 70 has a first end 72 and a second end 74, as most clearly illustrated in FIG. 4. At the first end 72, a head 76 is provided that is larger than the apertures in the tongue portion 20 and the handle portion 22. At the second end 74 of the attaching pin 70, a cotter pin hole 80 is preferably formed therein. When the attaching pin 70 is inserted through the tongue portion 20 and the handle portion 22, it is retained in place by the head 76 and a cotter pin 82, which is inserted through cotter pin hole 80.

In operation, the convertible handle 10 is oriented in the first configuration by orienting the second end 52 of the handle portion 22 away from the tongue portion 20. One of the attaching pins 70 is extended through the first clevis apertures 40 and the pivot aperture. The cotter pin 82 is then extended through the cotter pin hole 80.

Figure 6:
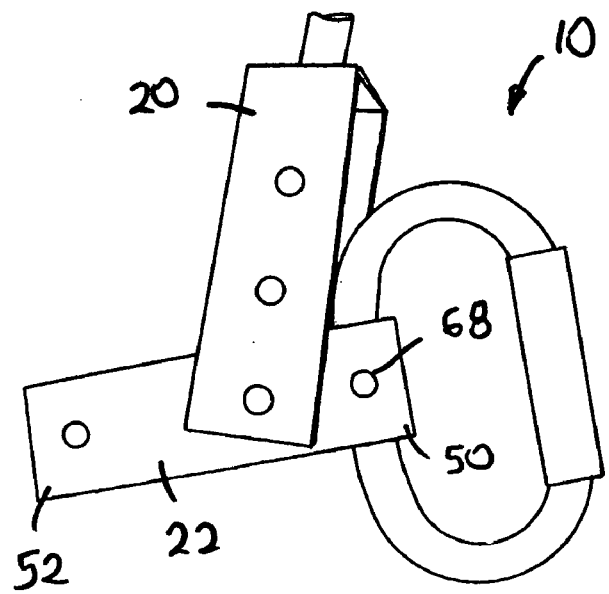
FIG. 6 is a top view of the convertible handle in an intermediate configuration.

In this configuration, the handle portion 22 is pivotable with respect to the tongue portion 20 from the first configuration (FIGS. 2–3) to an intermediate configuration (FIG. 6) and then to the second configuration (FIGS. 4–5).

When the handle portion 22 is oriented in the first configuration, one of the attaching pins 70 is extended through the second clevis apertures 42 and the clevis aperture 64 and one of the cotter pins 82 is extended through the cotter pin hole 80 to retain the handle portion 22 in the first configuration.

When it is desired to change the convertible handle 10 to the second configuration, the cotter pin 82 is detached from the attaching pin 70 and the attaching pin is removed from the second clevis apertures 42 and the clevis aperture 64. The handle portion 22 is then rotated with respect to the tongue portion 20 so that the first end 50 is oriented away from the tongue portion 20.

The attaching pin 70 is then extended through the second clevis apertures 42 and the locking aperture 68 and one of the cotter pins 82 is extended through the cotter pin hole 80 to retain the handle portion 22 in the second configuration.

Figure 7:
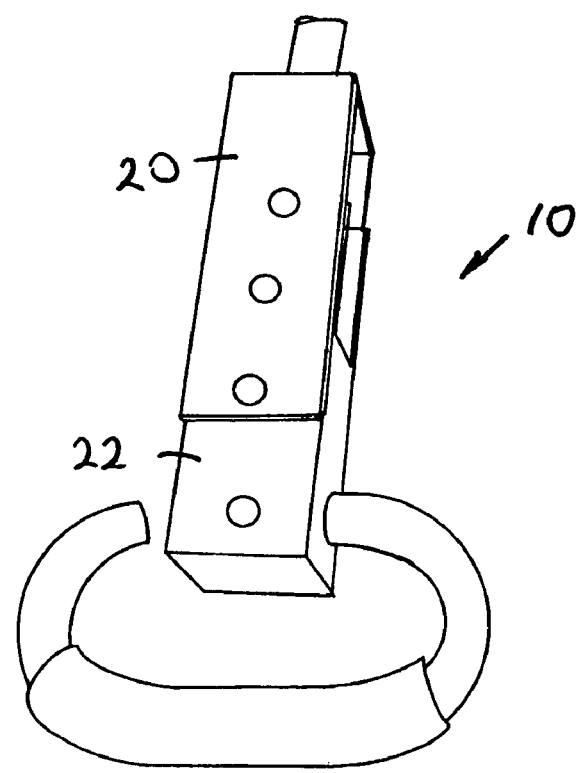
FIG. 7 is a top view of an alternative embodiment of the convertible handle.

While the gripping region 54 is illustrated as being a loop with both ends attached to the handle portion 22 in most of the figures, the concepts of the present invention are adaptable for use in with other configurations of the gripping region 54 such as a loop with only one end attached to the handle portion 22, as illustrated in FIG. 7.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A convertible handle, comprising:
   a handle portion pivotally attached to a tongue portion, the handle portion having a first gripping portion end and a second clevis end and an intermediate pivot, the handle portion being pivotably shiftable about the intermediate pivot between a first disposition presenting the gripping portion end proximate an end of the tongue portion and a second disposition presenting the clevis end proximate the end of the tongue portion.

2. The convertible handle of claim 1, wherein a first end of the tongue portion has a shaft extending therefrom.

3. The convertible handle of claim 1, wherein a second end of the tongue portion has a clevis formed therein, wherein the clevis has a pair of branches.

4. The convertible handle of claim 1, wherein the clevis end on the handle portion has a pair of branches, wherein each of the branches have a clevis aperture formed therein.

5. The convertible handle of claim 1, wherein the handle portion is pivotably attached to the tongue portion with an attaching pin.

6. A convertible handle, comprising:
   a tongue portion having a first end and a second end, wherein the first end is suited for attachment to an object that is to be towed; and
   a handle portion pivotally attached to the tongue portion, the handle portion having a first end and a second end, the handle portion having a clevis formed therein proximate the first end, and wherein the handle portion has a gripping region proximate the second end that is oriented substantially transverse to the handle portion, the second end of the tongue portion having a clevis formed therein, wherein the clevis has a pair of branches and wherein each of the branches have a first clevis aperture and a second clevis aperture.

7. The convertible handle of claim 6, wherein the gripping region is at least partially located in the tongue portion clevis when the handle portion is in a second configuration.

8. The convertible handle of claim 6, wherein the handle portion has a pivot aperture formed therein intermediate the first end and the second end.

9. A convertible handle, comprising:
   a tongue portion having a first end and a second end, wherein the first end is suited for attachment to an object that is to be towed; and
   a handle portion pivotally attached to the tongue portion, the handle portion having a first end and a second end, the handle portion having a clevis formed therein proximate the first end, and wherein the handle portion has a gripping region proximate the second end that is oriented substantially transverse to the handle portion, the second end of the tongue portion having a clevis formed therein, wherein the handle portion has a pivot aperture formed therein intermediate the first end and the second end and the handle portion has a locking aperture formed therein intermediate the pivot aperture and the second end.

10. The convertible handle of claim 9, wherein the gripping region is covered with a resilient foam material.

11. A method of operating a convertible handle, the method comprising:
pivotally attaching a handle portion to a tongue portion, wherein the handle portion has a first end and a second end, forming a clevis therein proximate the first end and forming a gripping region proximate the second end and orienting the gripping region substantially transverse to the handle portion;
moving the handle portion to a first configuration where the gripping region is exposed for gripping thereof; and
moving the handle portion to a second configuration where the clevis is exposed and the gripping region is at least partially disposed within the clevis.

12. The method of claim 11, and further comprising retaining the handle portion in the first configuration by extending an attaching pin through the tongue portion and the handle portion.

13. The method of claim 11, and further comprising retaining the handle portion in the second configuration by extending an attaching pin through the tongue portion and the handle portion.

14. The method of claim 11, and further comprising attaching the tongue portion to an object that is to be towed.

* * * * *

UNITED STATES PATENT AND TRADEMARK OFFICE
CERTIFICATE OF CORRECTION

| | |
|---|---|
| PATENT NO. | : 7,210,697 B2 |
| APPLICATION NO. | : 11/014247 |
| DATED | : May 1, 2007 |
| INVENTOR(S) | : Dennis Simpson |

Page 1 of 1

It is certified that error appears in the above-identified patent and that said Letters Patent is hereby corrected as shown below:

<u>Column 3, Line 67</u>:

Delete "in".

Signed and Sealed this

Twenty-seventh Day of November, 2007

JON W. DUDAS
*Director of the United States Patent and Trademark Office*